United States Patent
Henning

(10) Patent No.: US 7,494,177 B2
(45) Date of Patent: Feb. 24, 2009

(54) BULKHEAD CONSTRUCTION

(75) Inventor: Steven A. Henning, Speedway, IN (US)

(73) Assignee: Aero Industries, Inc., Indianapolis, IN (US)

( * ) Notice: Subject to any disclaimer, the term of this patent is extended or adjusted under 35 U.S.C. 154(b) by 376 days.

(21) Appl. No.: 11/174,917

(22) Filed: Jul. 5, 2005

(65) Prior Publication Data
US 2007/0021048 A1 Jan. 25, 2007

(51) Int. Cl.
*B62D 33/02* (2006.01)

(52) U.S. Cl. .................. 296/186.1; 296/191; 296/29

(58) Field of Classification Search ......... 296/182.1, 296/185.1, 186.1–186.5, 191, 193.04, 193.05, 296/180.1, 180.4, 105, 29; 180/903, 311; 410/129, 140, 155
See application file for complete search history.

(56) References Cited

U.S. PATENT DOCUMENTS

| | | | | |
|---|---|---|---|---|
| 4,947,293 | A * | 8/1990 | Johnson et al. | 362/485 |
| 5,287,814 | A | 2/1994 | Masai et al. | |
| 5,538,313 | A * | 7/1996 | Henning | 296/100.12 |
| 5,638,973 | A | 6/1997 | Dewey et al. | |
| 5,782,549 | A * | 7/1998 | Glatzmeier et al. | 362/485 |
| 6,065,796 | A * | 5/2000 | Verduyn | 296/100.12 |
| 6,196,786 | B1 * | 3/2001 | Shinohara | 414/498 |
| 6,312,040 | B1 * | 11/2001 | Shinohara | 296/100.12 |
| 6,419,301 | B1 * | 7/2002 | Tuerk | 296/186.1 |
| 6,470,990 | B1 | 10/2002 | Panoz | |
| 6,793,273 | B1 * | 9/2004 | Tuerk | 296/186.1 |
| 6,929,311 | B2 * | 8/2005 | Booher | 296/182.1 |
| 7,014,252 | B2 * | 3/2006 | Booher | 296/182.1 |
| 7,178,860 | B2 * | 2/2007 | Lemmons | 296/186.1 |
| 7,237,932 | B2 * | 7/2007 | Ter-Hovhannissian | 362/485 |
| 7,344,178 | B2 * | 3/2008 | Lowry et al. | 296/100.12 |
| 7,378,000 | B2 * | 5/2008 | Lemmons | 296/186.1 |
| 2003/0011211 | A1 * | 1/2003 | Booher | 296/181 |

OTHER PUBLICATIONS

Aero Industries, Inc., *Step, Saddle and Tractor Boxes*, ©2000, 3 pages).
Aero Industries, Inc., *Flatbed Accessories*, 3 pages.
PCT International Search Report for PCT/US06/24151, mailed Dec. 14, 2006.

* cited by examiner

*Primary Examiner*—Glenn Dayoan
*Assistant Examiner*—Gregory Blankenship
(74) *Attorney, Agent, or Firm*—Maginot, Moore & Beck LLP

(57) ABSTRACT

A bulkhead for a transport vehicle, such as a flatbed trailer, includes a corrugated front panel, side panels attached to the sides of the front panel and a top panel attached to the upper edge of the front panel. The side and top panels are formed from two interlocking extrusions that are substantially identical whether used to form the top panel or the side panels. The extrusions include a first extrusion with a substantially forward facing wall that is angled and curved relative to the front panel. A second extrusion is connected to the first through a male-female interlocking connection along the mutual length of the extrusions. The second extrusion includes a side facing wall and a forward facing wall portion that merges with the forward facing wall of the first extrusion to form non-perpendicular side corners of the bulkhead. The side and top panels combine to form open upper corners that support a light assembly and corner bezel. A decorative panel is mounted to and covering the corrugated front panel.

14 Claims, 4 Drawing Sheets

BULKHEAD CONSTRUCTION

BACKGROUND

The present invention relates to bulkheads that are especially suited for mounting on a flatbed trailer.

Flatbed trailers are a common transport vehicle for hauling a wide range of items, ranging from heavy machinery to foundry products to packaged goods. Department of Transportation regulation §393.114 requires that every cargo-carrying vehicle be equipped with "a headerboard or similar device of sufficient strength to prevent load shifting and penetration or crushing of the driver's compartment." This regulation defines the necessary structural aspects and dimensions of the headerboard, or bulkhead as it is referred to in the industry. The bulkhead is typically configured to be fastened to the cargo bed of the vehicle.

A typical wrap bulkhead and installation is depicted in FIGS. 1-2. The bulkhead 10 includes a top panel 12 that is welded or bolted to a front panel 13. The front panel wraps around to from opposite side walls 14. In certain bulkhead designs, attachment brackets 16 extend from the side walls for attachment to the side rails of the hauling bed. In one installation, the bulkhead 10 is fastened to the side rails S of a trailer bed T. An extendable tarping system C mounted on the trailer bed is configured to engage the bulkhead 10 to form a weather-tight seal about the cargo being shipped on the trailer.

The typical bulkhead is formed of sheet metal, such as aluminum. A single sheet of metal is corrugated to form the front wall 15 and is bent at right angles to form the integral side walls 14 of the front panel 13. The top panel 12 is separately formed in a bending operation and welded or fastened to the front panel 13. In some bulkheads, the top panel is simply a flat metal sheet welded or an box beam extending across the top edge of the front panel. Many sheet metal bulkheads require various stiffening beams on the front panel and side walls.

Although the typical bulkhead is formed of sheet metal, forming the front panel can be problematic. In particular, forming the side walls of the front panel requires a separate bending step from the corrugation process. In addition, contouring the corners of the top panel, although not complicated, is an involved process, as well as accurately mating the top panel 12 to the front panel 13. In some bulkheads of the prior art, the top rail and front panel are connected by a corner casting.

Another problem experienced by the typical bulkhead is that the corner configuration limits the turning radius of the trailer in some applications. In particular, since the side walls 14 are typically formed at a substantially right angle bend relative to the front wall 15 of the front panel 13. Where the trailer kingpin is close to the cab of the hauling tractor, sharp turns will cause the corners of the front panel 13 to contact the trailer.

Consequently, there is a need for an improved bulkhead construction that overcomes the problems and shortcomings of the typical DOT-rated headerboard or front bulkhead.

SUMMARY OF THE INVENTION

A bulkhead for a transport vehicle, such as a flatbed trailer, includes a corrugated front panel, side panels attached to the sides of the front panel and a top panel attached to the upper edge of the front panel. In one embodiment, the side and top panels may be formed from two interlocking extrusions that are substantially identical whether used to form the top panel or the side panels. The extrusions include a first extrusion with a substantially forward facing wall that is angled and curved relative to the front panel. A second extrusion is connected to the first through a male-female interlocking connection along the mutual length of the extrusions. The second extrusion includes a side facing wall and a forward facing wall portion that merges with the forward facing wall of the first extrusion to form non-perpendicular side corners of the bulkhead.

In one feature of the invention, the same first and second extrusions may be used to form either a side panel or the top panel. In certain embodiments, the only difference between the first extrusions is that the extrusion is longer when used for the side panel. Both the transverse cross-sections of the two extrusions are the same whether used for a side panel or a top panel.

In one feature, the side and top panels combine to form open upper corners. These corners support a light assembly and corner bezel.

In another aspect, a decorative panel is mounted to and covering the corrugated front panel. The decorative panel may also include side edge flanges for engagement within slots defined along the length of the first extrusion.

One object of the invention is to provide a bulkhead that is more easily and efficiently manufactured. Another object is embodied in features that allow the use of common extrusions to form side and top panels for a bulkhead. In addition to meeting these objects, one benefit of the present invention is that it presents a more aerodynamic and maneuverable bulkhead for a flatbed trailer.

DESCRIPTION OF THE PREFERRED EMBODIMENTS

Figure 1:
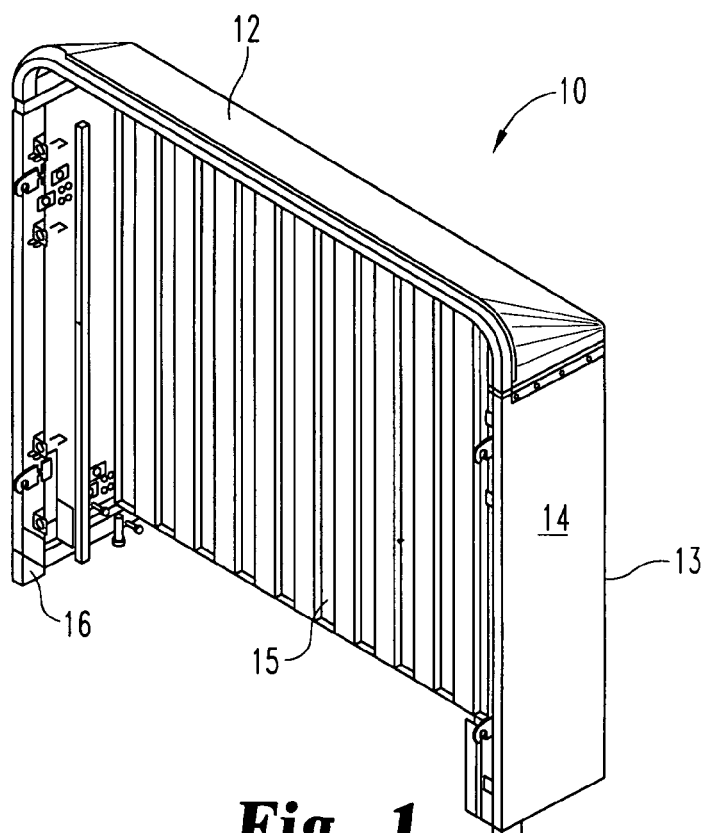
FIG. 1 is a rear perspective view of a front bulkhead of the prior art.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates a bulkhead construction formed from a corrugated front panel and extruded elements that are combined to form the top panel and the side panels for the bulkhead. In the preferred embodiment, two extrusions are combined to form the top and side panels in a manner that enhances the structural strength and integrity of the panels. In addition, the combined extrusions present a curved side edge that avoids the turning radius interference problem of prior bulkheads. Moreover, the extrusions improve the aerodynamics of the bulkhead over prior art bulkheads without any commensurate increase in the complexity of the manufacture of the bulkhead Referring to FIG. 3, the bulkhead 20 includes a corrugated front panel 22 that may be formed in a conventional manner. However, unlike the front panel of the prior art bulkhead, the front panel 22 of the present invention does not require integral side walls and instead may be formed in a single plane according to standard metal forming techniques. The corrugations may be of standard width as necessary to make the bulkhead sufficiently strong and/or as required under DOT regulations. The corrugated front panel 22 is preferably bounded on its bottom and top edges by a bottom rail 43 and a top rail 45. The two rails 43, 45 are fastened to the front panel in a known manner, such as by welding. The bottom rail 43 may be in the form of a flat plate, while the top rail 45 may be in the form of a generally U-shaped channel or rectangular tube that fits over the corrugations in the front panel 22.

Figure 5:
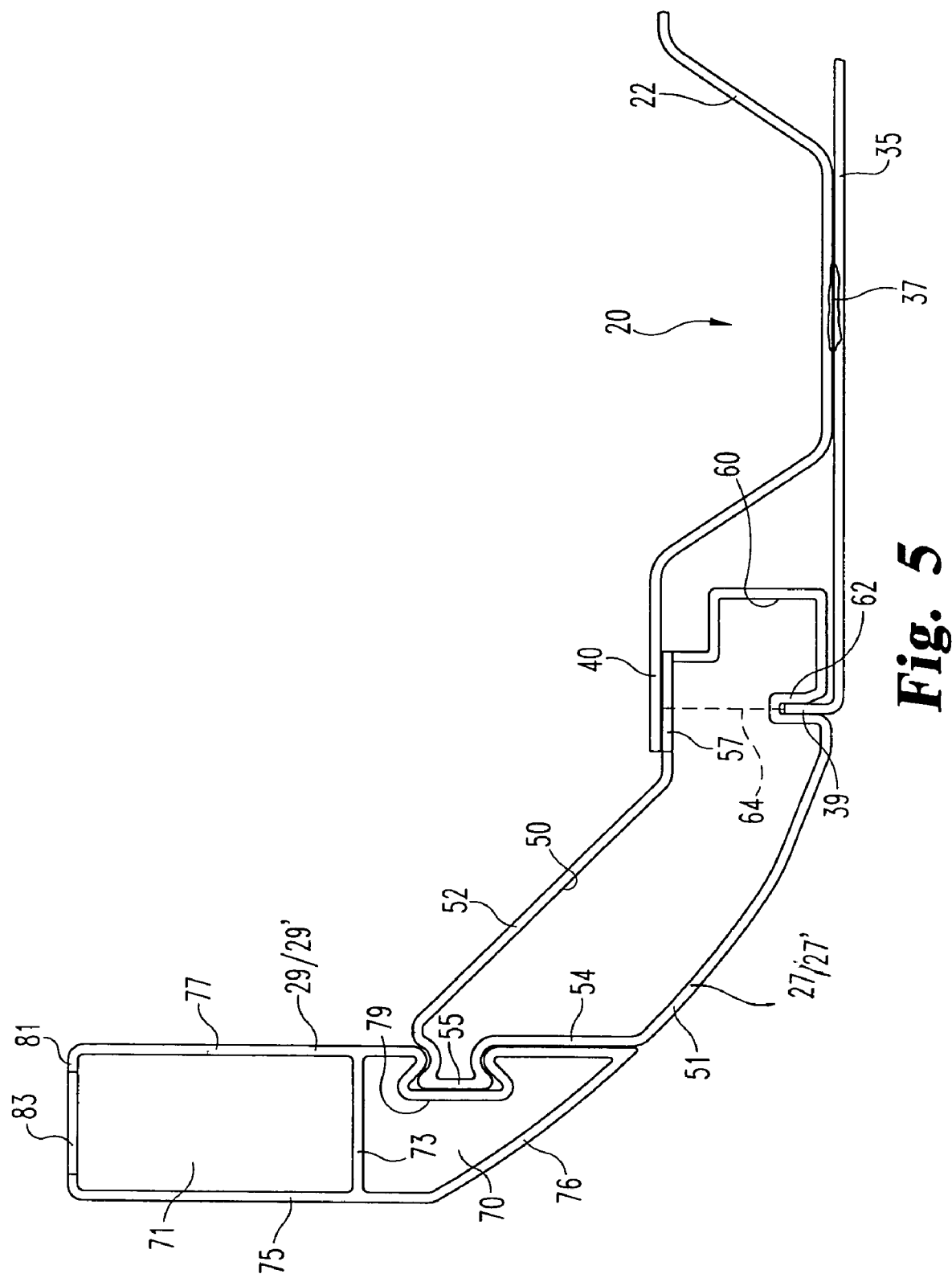
FIG. 5 is a top elevation view of the extrusions forming the side walls of the bulkhead construction shown in FIG. 3.

In lieu of the side walls 14 found in prior bulkheads, the present invention contemplates a combined extrusion 25 that is attached to each side edge of the corrugated front panel 22. As best shown in FIG. 5, the combined extrusion 25 includes a first elongated extrusion 27 and a second elongated extrusion 29. Both extrusions are preferably hollow along substantially their entire length so that the first extrusion forms a hollow interior 50 while the second extrusion forms hollow interiors 70, 71 separated by a wall 73. The wall 73 adds rigidity and strength to the second extrusion 29.

The first extrusion 27 includes an outer wall 51 and an inner wall 52, connected at one side by a side wall 54. The outer wall 51 faces substantially the same direction as the front panel 22—e.g., presents a substantially forward facing surface. The side wall 54 defines an interlocking rib 55 that extends along substantially the entire length of the extrusion and is used to connect the first extrusion to the second extrusion. The opposite side of the first extrusion 27 includes an attachment wall 57 that extends at an angle relative to the inner wall 52, as shown in FIG. 5. The attachment wall 57 is particularly configured for attachment to an edge portion 40 of the corrugated front panel 22. This attachment is preferably accomplished by welding the edge portion 40 to the attachment wall 57 at a plurality of points along the length of the extrusion. In the illustrated embodiment, the first extrusion is coextensive with the front panel 22 and the bottom and top rails 43, 45. Since the first extrusion 27 includes a hollow interior 50, the edge portion 40 of the front panel 22 may be spot welded to the attachment wall 57.

The first extrusion further includes an inner beam portion 60 that connects the attachment wall 57 to the outer wall 51. The inner beam portion 60 caps the side of the first extrusion opposite the side wall 54. In addition, the beam portion may define a groove 62 that faces outward, as shown in FIG. 5. This groove may be used to support a decorative panel 35 (FIGS. 3 and 5), and in particular to receive an edge flange 39 of the panel.

Figure 3:
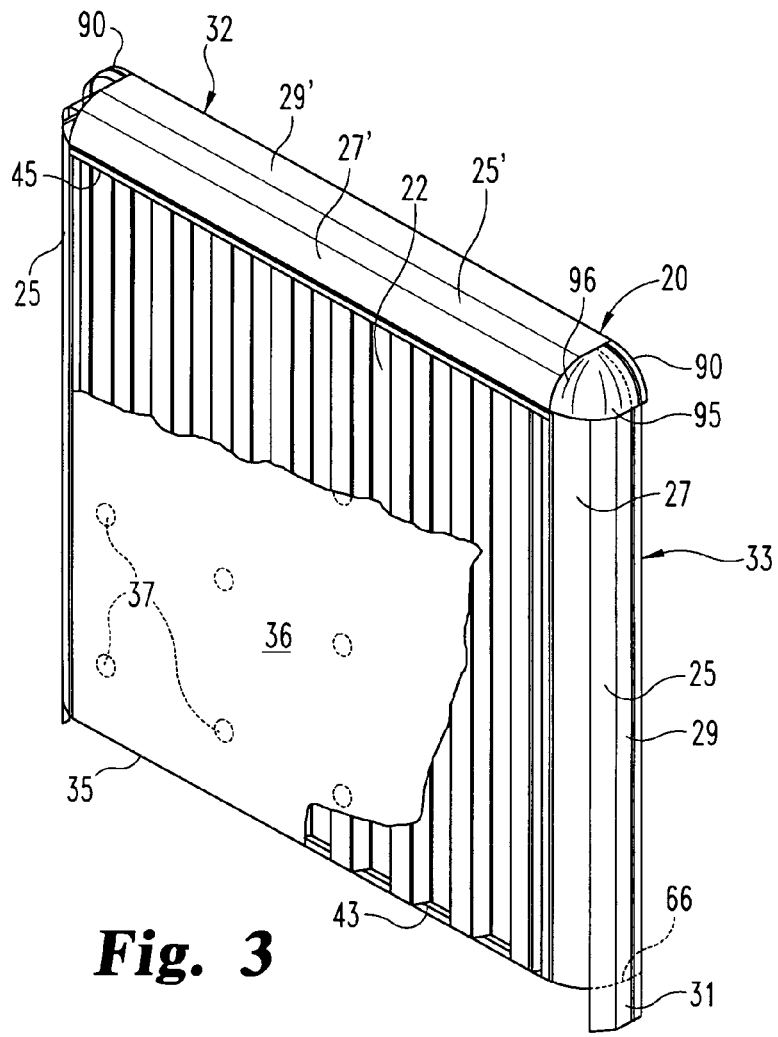
FIG. 3 is a front perspective view of an improved bulkhead construction according to one embodiment of the present invention.

As illustrated in FIG. 3, the panel 35 may be affixed to the corrugated front panel 22 at a plurality of connection points 37. In the view of FIG. 3, the decorative panel 35 is cut away to expose the corrugated panel beneath; however, it is understood that the decorative panel is at least co-extensive with the frontal area of the front panel 22. As shown in FIG. 5, the decorative panel 35 may include side edges 39 that are arranged to engage the groove 62 in each first extrusion 27 at the opposite sides of the bulkhead. The decorative panel spans the vertical dimension between the bottom and top rails 43, 45, and may include top and bottom edges that are angled like the side edges 39 to engage the groove 62 in a top panel extrusion 27', as described below.

In a preferred embodiment, the decorative panel 35 is attached to the front panel 22 using an adhesive adapted to bond metal parts together. Other forms of attachment are also contemplated, although it is most preferable that the attachment method be such that the exposed surface 36 is not marred or disturbed.

The decorative panel 35 may carry any indicia desired by the owner of the trailer or may have a variety of aesthetically pleasing configurations, such as a mesh screen appearance. Moreover, the panel is preferably configured to be removed and replaced as desired. While a primary purpose of the panel 35 is cosmetic, the panel may also improve the aerodynamics of the bulkhead by covering the uneven corrugated surface of the front panel 22. Finally, the attachment of the decorative panel to the corrugated panel can increase the bending strength of the bulkhead.

Figure 4:
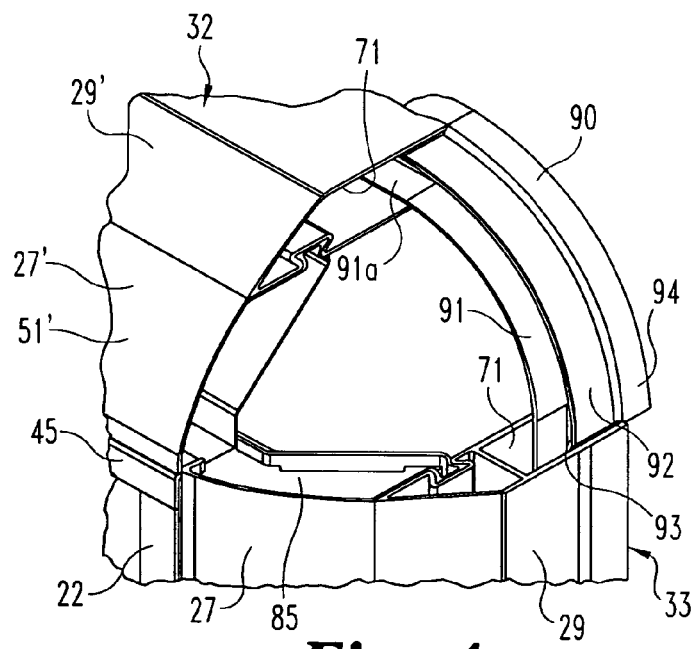
FIG. 4 is an enlarged view of an upper corner of the bulkhead construction shown in FIG. 3, with a light assembly removed.

As shown in the detail view of FIG. 4, the end of the first extrusion 27 may be closed by a reinforcement plate 85 that is placed inside the hollow interior 50. Preferably, the plate 85 is welded to the outer and inner walls 51, 52 to form a unitary construction. Moreover, a second plate is preferably welded to close the hollow interior at the bottom of the extrusion 27. As shown in FIG. 4, the reinforcement plate 85 preferably follows the contour of the first extrusion, including the curved outer wall 51, the angled inner wall 52 and at least a portion of the attachment wall 57.

Figure 2:
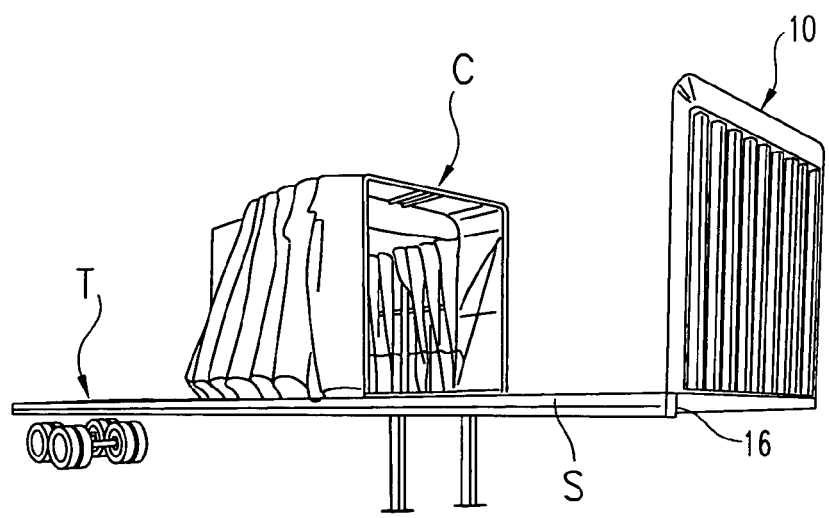
FIG. 2 is a side perspective view of the bulkhead shown in FIG. 1 mounted on a flatbed trailer in one known installation.

The combined extrusion 25 further includes a second extrusion 29, as shown in FIGS. 3-5. The second extrusion includes an interior wall 73 spanning between an outer wall 75 and an inner wall 77, as best seen in FIG. 5. The interior wall divides the second extrusion into two hollow interiors 70 and 71. When used to form the side panels 33, the second extrusion 29 may include a side post portion 31 that projects below the bottom rail 43 of the corrugated front panel 22. This post portion 31 provides the ability to attach the bulkhead 20 to the side rails S of the trailer T (FIG. 2) in the same manner as the attachment bracket 16 of the prior bulkhead 10. Thus, a number of bolts or screws may be driven through the post portion 31 to fasten the bulkhead to the trailer side rails. Preferably, the hollow interior 71 is filled at the side post portion 31 so that a bolt or screw may be driven through the post portion without buckling the portion as the fastener is tightened.

The side post portion 31 may be filled with any suitable material that can resist the compressive forces associated with driving a fastener through the post portion 31 into the side rail of the hauling trailer and that can resist shearing or buckling of the extrusion post portion 31 as the bulkhead twists under normal usage loads. For instance, a metal block may be fashioned to fit within the hollow interior 71 at the side post portion 31. The block is preferably sized to extend above the bottom edge of the front panel 22 and is welded at its top and bottom to the extrusion 25.

The second extrusion 29 includes an interlocking channel 79 defined in the inner wall 77. This interlocking channel 79 is configured to receive the interlocking rib 55 of the first extrusion 27. In the preferred embodiment, the interlocking components 55, 79 form a male-female connection. Moreover, the components preferably incorporate a dovetail configuration to prevent separation of the rib 55 from the channel 79. The combined extrusions 25 may be formed by sliding the rib 55 of the first extrusion 25 into the channel 79 of the second extrusion 27. The two extrusions may be permanently attached in any known manner, such as by welding the extrusions together at the interlocking rib and channel.

An end wall 81 connects the inner wall 77 and outer wall 75 to form the hollow interior 71. The other hollow interior 70 of the second extrusion 27 is formed by the outer wall 75, the inner wall 77 and the interior wall 73. As shown in the figures, the outer wall 75 is generally side facing (in relation to the forward facing front panel 22). The outer wall 75 is integral with a generally front facing angled portion 76 that blends into the angled outer wall 51 of the first extrusion. In general terms, the wall portions 51 and 76 combine to form a non-perpendicular corner. More particularly, the portion 76 and outer wall 51 are preferably curved at a large radius, such as about 8-9 inches. The angled/curved outer surface presented by the combined extrusions 25 improves the turning radius of the trailer by eliminating the "corner" material found in prior bulkheads. The outer surface of this feature also provides a more aerodynamic aspect than prior bulkheads. Moreover, this improved outer surface is created with no significant increase in overall dimension of the bulkhead.

As depicted in FIG. 5, the combined extrusions 25 are positioned at the sides of the corrugated front panel 22. One benefit of the extrusions 27 and 29 that form the combined extrusion is that they can also be used to form the top panel 32 to the bulkhead 20, as shown in FIGS. 3-4. In the preferred embodiment, a modified first extrusion 27' and a modified second extrusion 29' form a combined extrusion 25' that is mounted on the top rail 45 of the bulkhead 20. In particular, the second extrusion may be modified by removing the side post portion 31 below the modification line 66. Of course, the length of the modified second extrusion 29' can be adjusted to match the width across the top of the front panel 22, which means that the modification line 66 may be unnecessary or may be moved to a different position on the extrusion. Beyond this modification, the second extrusion 29' is identical to the extrusion 29 used to form the side panel of the bulkhead.

Similarly, the first extrusion 27' may be modified to account for its use as the top panel of the bulkhead 20. In particular, as can be discerned from FIG. 4, the first extrusion 27' of the top panel 32 must integrate with the first extrusion 27 of the side panel 33 at the corner of the bulkhead. Thus, the first extrusion 27' of the top panel is preferably modified by removing the inner beam portion 60 at the modification line 64 shown in FIG. 5. Removing this element of the first extrusion 27' allows the outer wall 51' to be supported on the top rail 45 without interfering with the inner beam portion 60 of the extrusion 27 forming the side panel 33. This modification requires removal of a segment of the inner beam portion 60 at each end of the modified first extrusion 27' sufficient to provide clearance for the inner beam portion of the extrusion 27 for the side panels. Nevertheless, like the second extrusion, a common extrusion may be produced that can be used unmodified to form the side panel 33 or modified to form the top panel 32.

A further benefit provided by the common extrusions 25 and 25' is the ability to create a top corner on the bulkhead that can be capped by a separate component without requiring the complicated sheet metal forming that accompanied prior bulkhead constructions. In one embodiment, a corner piece 90 is provided that extends between the second extrusion 29 of the side panels 33 to the second extrusion 29' of the tip panel 32, as shown best in FIG. 4. In this embodiment, the corner piece is cured at a uniform radius with an inner band 91 and an outer band 92 configured to fit within the hollow interior 71 of the corner opposed second extrusions. The bands 91, 92 are connected by a bridge plate 93. The two bands 91, 92 have a portion, such as portion 91a, that is long enough to extend sufficiently into the hollow interiors 71 of the two extrusions to effectively hold the corner piece 90 in place at the corner of the bulkhead.

In certain embodiments, the corner piece includes a rear band 93 that projects from the outer band 92 beyond the end of the end wall 81 of the extrusions 29/29' and flares slightly outward, as illustrated in FIG. 5. To accommodate this rear band 93, the end wall 81 of the extrusions may include a notch 83 through which the band extends. A similar band can be integrated into the inner band 91. The rear bands 94 can receive the corner of a movable cover system, such as the system C shown in FIG. 2.

In certain embodiments of the bulkhead construction, a corner plate may be fashioned to fill the triangular generally spherical segment shown in FIG. 4 between the corner piece 90 and the free edges of the combined extrusions 25 and 25'. Alternatively, and preferably, a light assembly 95 (FIG. 3) is mounted to the extrusions at the corner, and a molded bezel 96 is fastened to the cover the light assembly. The bezel can be readily molded from a high strength plastic of any desired color, lens or light scattering characteristic. In one specific embodiment, the light assembly 95 is tied to the vehicle turn signals and the corner bezel 96 is configured accordingly.

The bulkhead 20 is configured for a variety of applications where a wrap bulkhead is used. Thus, the bulkhead may be used on an open flatbed or a flat bed that is closed by solid panel walls, such as a stake and panel kit. Alternatively, the bulkhead of the present invention may also be used in association with a retractable/extendable cover system, such as the tarping system C depicted in FIG. 2. Thus, in accordance with an alternative embodiment, a combined extrusion 25" may be modified to provide a tight seal between the extrusion and the front beam of the retractable tarping system.

Figure 6:
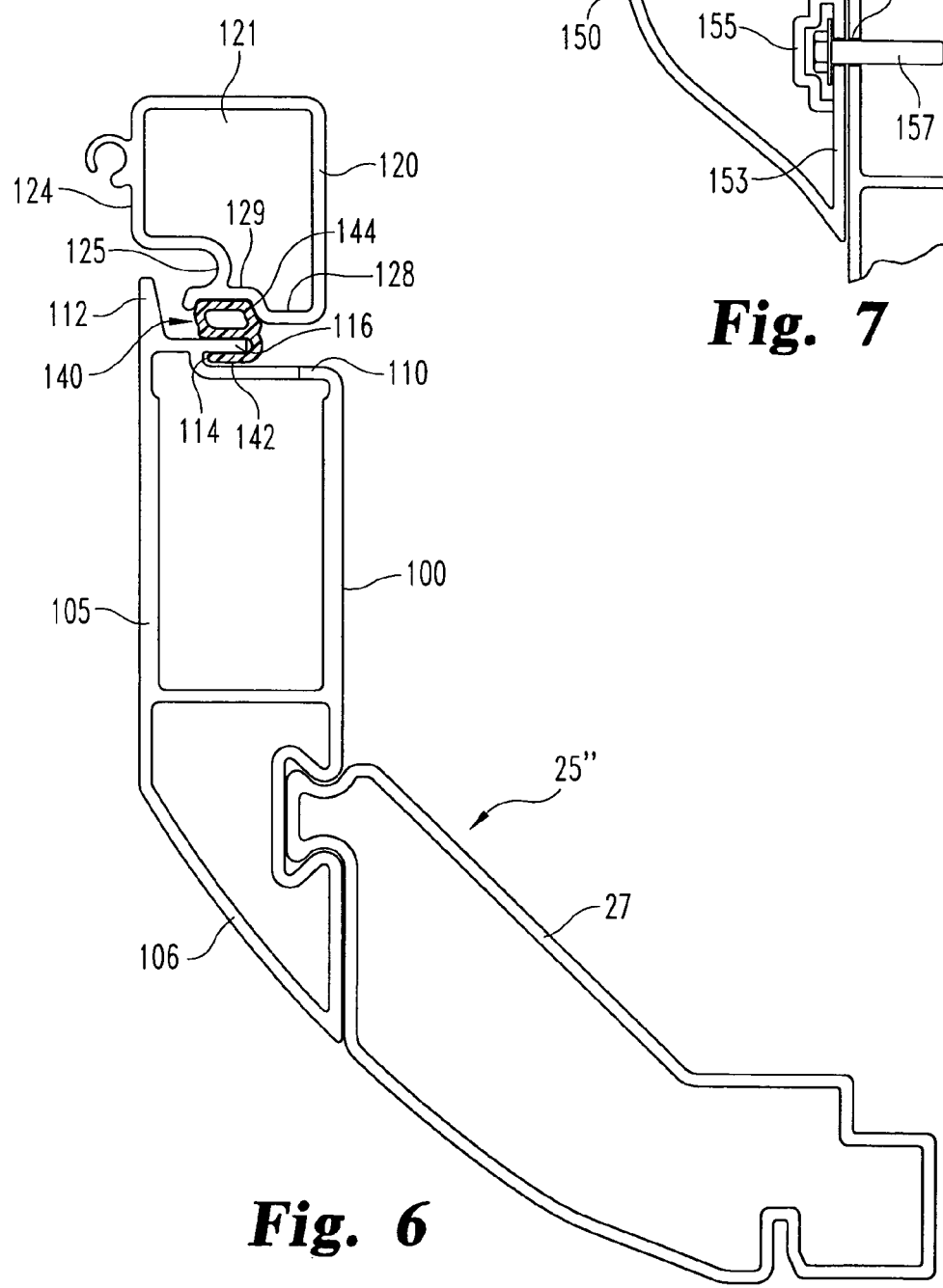
FIG. 6 is a top elevation view of extrusions forming side walls of a bulkhead construction according to a further embodiment of the invention that is particularly suited to mate with an extendable/retractable flatbed cover system.

In particular, in the embodiment shown in FIG. 6, the combined extrusion 25" includes the leading extrusion 27 described above without any significant modification. The trailing extrusion 100 is similar to the extrusions 29, 29' with certain modifications to accommodate the front beam 120 of the tarping system. Thus, the cured wall portion 106 may be configured like the curved wall portion 76 to integrate with the leading extrusion 27. The outer wall 105 is similar to the outer wall 75 except that it includes an extension 112 that is configured to overlap the mating fit between the retractable tarp front beam 120 and the extrusion 100, as shown in FIG. 6.

The extrusion 100 includes a rear wall 110 that is modified to include an inwardly projecting lip 116 that forms a recess 114. The lip 116 is configured to support a seal 140 that extends around the entire perimeter of the bulkhead. The seal includes a clip portion 142 that is configured to clip onto the lip 116. The end of the lip may include an enlarged bead (not shown) to improve the attachment of the seal 140 to the lip 116. The seal includes a compressible body 144 that interfaces with the retractable cover front beam 120. The front beam 120 is preferably an extruded beam with a hollow interior 121. The front wall 128 of the beam 120 defines a recess 129 configured to snugly receive the compressible body 144 of the seal 140 when the front beam is locked to the trailing extrusion 100 in a known manner.

In a further feature of the invention, the front beam 120 defines a channel 125 in the side wall 124. The channel runs the entire length of the beam and opens at the bottom of the construct. This channel 125 serves as a drain channel for rain that collects between the extension 112 and the seal 140, particularly when the extrusion 100 is used as part of a top panel construction.

Figure 7:
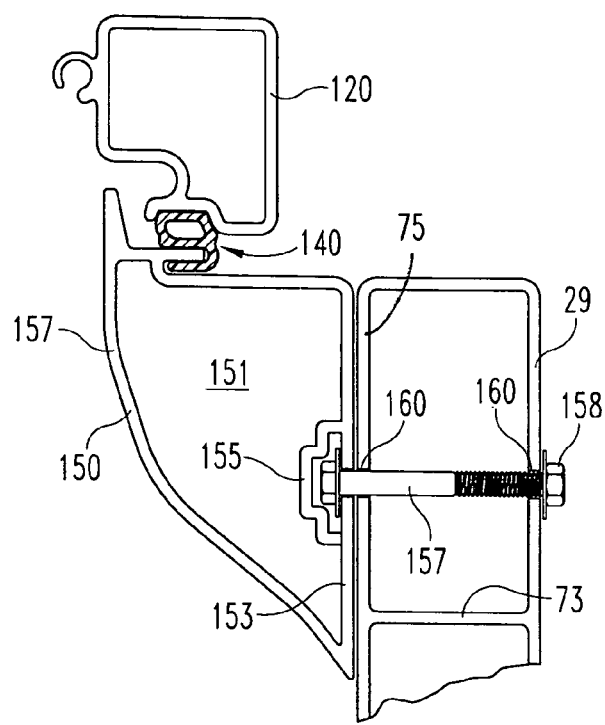
FIG. 7 is a partial top elevation view of an extrusion for use with the side panel extrusions shown in FIG. 5 to extend the effective width of the bulkhead according to a further embodiment of the invention.

In a further variation of the invention, an embodiment is provided that increases the effective width of the bulkhead. In this embodiment, depicted in FIG. 7, an extension extrusion 150 is provided that is attached to the outer wall 75 of the trailing extrusion 29. The extension extrusion 150 includes a hollow interior 151, like the other extrusions described above. The outer wall 157 may be configured aerodynamically, as depicted in FIG. 7 and may configured to mate with a front beam 120 of a retractable cover system, as described above.

The extension extrusion 150 may be attached to the trailing extrusion 29 in a variety of ways. In the preferred embodiment, the extrusion defines a T-slot 155 along its length. The slot is configured to receive a plurality of bolts 157 that extend through corresponding holes 160 in the trailing extrusion. A nut 158 is tightened onto each bolt to firmly attach the extension extrusion 150 to the trailing extrusion 29.

The extrusions described herein are preferably formed of aluminum in a known extrusion process. Each extrusion may be provided to the bulkhead manufacturer cut to a pre-determined length corresponding to the dimensions of a particular bulkhead. Alternatively, the extrusions may be provided in a length from which several pre-determined lengths can be cut by the bulkhead manufacturer. For instance, for a bulkhead requiring second extrusions in 84 inch lengths to form the side panels 33 and a second extrusion of 96 inch length to form the top panel 32 may be cut from a single extruded piece of 264 inches.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A bulkhead for the bed of a transport vehicle, comprising:
   a front panel having a width sized to span at least a substantial portion of the width of the bed of the transport vehicle, and including a lower edge for positioning adjacent the bed, an opposite upper edge and intermediate opposite side edges; and
   a side panel attached to each of said side edges, said side panel including a first elongated extrusion having a substantially front facing wall relative to said front panel, and a second elongated extrusion having a substantially side facing wall relative to said front panel and a substantially forward facing wall portion integral with said side facing wall, said wall portion combining with said front facing wall of said first extrusion to form a non-perpendicular side corner of the bulkhead, said first and second elongated extrusions defining a male-female interlocking interface along a mutual length thereof.

2. The bulkhead of claim 1, wherein said wall portion of said second extrusion and said front facing wall of said first extrusion are defined at a substantially common radius.

3. The bulkhead of claim 1, wherein said front panel is vertically corrugated.

4. The bulkhead of claim 1, wherein:
   said front panel includes side edge portions; and
   said first extrusion includes an inner wall opposite said substantially forward facing wall, said inner wall attached to a corresponding one of said side edge portions of said front panel.

5. The bulkhead of claim 1, wherein said second extrusion is longer than said first extrusion to form a side post portion at the bottom of said second extrusion configured to be fastened to a side rail of the transport vehicle.

6. The bulkhead of claim 5, wherein said second extrusion is hollow along its length and said side post portion is substantially solid to receive a fastener therethrough.

7. The bulkhead of claim 1, further comprising a top panel attached to said upper edge of said front panel and including a modified first elongated extrusion substantially similar to said first elongated extrusion, and a modified second elongated extrusion substantially similar to said second elongated extrusion.

8. The bulkhead of claim 7, wherein said modified second extrusion is identical in transverse cross-section to said second extrusion.

9. The bulkhead of claim 8, wherein said modified second extrusion is shorter in length than said second extrusion.

10. The bulkhead of claim 7, wherein:
    said top panel and said side panels form a pair of opposite corners at the upper edge of said front panel; and
    said bulkhead includes a light assembly mounted at each of said corners.

11. The bulkhead of claim 1, further comprising:
    a decorative panel sized to substantially cover said front panel; and
    means for attaching said decorative panel to said front panel.

12. The bulkhead of claim 11, wherein said means for attaching includes a plurality of points of adhesion of said decorative panel to said front panel.

13. The bulkhead of claim 1, wherein said second elongated extrusion includes a rear wall configured to support a seal thereon for engagement with a front beam of a retractable cover system mounted on the flatbed.

14. The bulkhead of claim 1, further comprising:
    an extension extrusion having a rear wall configured to support a seal thereon for engagement with a front beam of a retractable cover system mounted on the flatbed; and
    means for attaching said extension extrusion to said side facing wall of said second elongated extrusion.

* * * * *